US012691737B2

(12) United States Patent
Rocholl et al.

(10) Patent No.: US 12,691,737 B2
(45) **Date of Patent: *Jul. 28, 2026**

---

(54) TOP DOOR FOR ELECTRIC REFUSE VEHICLE

(71) Applicant: Oshkosh Corporation, Oshkosh, WI (US)

(72) Inventors: Joshua D. Rocholl, Rochester, MN (US); Derek A. Wente, Austin, MN (US); John T. Kellander, Oronoco, MN (US); Cody D. Clifton, Mapleton, MN (US); Vincent Hoover, Byron, MN (US); Zachary L. Klein, Rochester, MN (US); Clinton T. Weckwerth, Pine Island, MN (US); Skylar A. Wachter, Dodge Center, MN (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/202,670

(22) Filed: May 26, 2023

(65) Prior Publication Data

US 2023/0294493 A1      Sep. 21, 2023

Related U.S. Application Data

(63) Continuation of application No. 16/851,320, filed on Apr. 17, 2020, now Pat. No. 11,697,331.

(Continued)

(51) Int. Cl.
*B60J 7/06*          (2006.01)
*B60J 7/16*          (2006.01)
(Continued)

(52) U.S. Cl.
CPC ............. *B60J 7/068* (2013.01); *B60J 7/1621* (2013.01); *B60J 7/201* (2013.01); *B65F 3/001* (2013.01);
(Continued)

(58) Field of Classification Search
CPC . B60J 7/068; B60J 7/1621; B60J 7/201; B60J 7/141; B60J 7/041; B60J 7/1614; B60J 7/10; B60J 7/1204
(Continued)

(56) References Cited

U.S. PATENT DOCUMENTS 1,740,779 A      12/1929  Nolen et al.
3,292,971 A  *  12/1966  Zucker ................... B60P 3/343
                                              296/100.1
(Continued)

FOREIGN PATENT DOCUMENTS

KR          101484775 B1  *  1/2015

OTHER PUBLICATIONS

"Translation of KR 101484775" (Year: 2015).*

*Primary Examiner* — Amy R Weisberg
*Assistant Examiner* — Veronica M Condo
(74) *Attorney, Agent, or Firm* — Foley & Lardner LLP

(57)          ABSTRACT

A refuse vehicle includes a chassis, a body assembly coupled to the chassis, an electric energy system, and a door system. The body assembly defines a refuse compartment. The body assembly has a cover that at least partially encloses the refuse compartment such that an opening is defined in the body assembly to provide access to the refuse compartment. The door system is coupled to the cover. The door system includes a panel and an electric actuator powered by the electric energy system. The electric actuator is configured to selectively reposition the panel between a first position
(Continued)

where the panel extends across the opening and a second position where the panel does not extend across the opening.

14 Claims, 14 Drawing Sheets

Related U.S. Application Data

(60) Provisional application No. 62/842,928, filed on May 3, 2019.

(51) Int. Cl.
  *B60J 7/20* (2006.01)
  *B65F 3/00* (2006.01)

(52) U.S. Cl.
  CPC ... *E05Y 2201/434* (2013.01); *E05Y 2201/654* (2013.01); *E05Y 2201/696* (2013.01); *E05Y 2201/716* (2013.01); *E05Y 2201/722* (2013.01); *E05Y 2900/518* (2013.01)

(58) Field of Classification Search
  USPC ...................................... 296/98, 101, 100.01
  See application file for complete search history.

(56) References Cited

U.S. PATENT DOCUMENTS

| | | | |
|---|---|---|---|
| 3,472,548 A * | 10/1969 | Comisac | B60J 7/068 |
| | | | 296/100.09 |
| 3,756,438 A * | 9/1973 | Steltz | B30B 9/3082 |
| | | | 414/525.5 |
| 3,910,629 A * | 10/1975 | Woodard | B60J 7/041 |
| | | | 296/183.2 |
| 3,913,969 A | 10/1975 | Hoch | |
| 4,200,330 A * | 4/1980 | Scott | B60P 7/02 |
| | | | 296/100.1 |
| 4,230,359 A | 10/1980 | Smith | |
| 4,302,044 A | 11/1981 | Sims | |
| 5,040,843 A | 8/1991 | Russell et al. | |
| 5,076,174 A | 12/1991 | Martin | |
| 5,238,359 A | 8/1993 | Chen | |
| 5,281,074 A * | 1/1994 | Mashuda | B60P 1/006 |
| | | | 414/525.2 |
| 5,316,430 A * | 5/1994 | Horning | B65F 3/001 |
| | | | 414/512 |
| 5,328,228 A * | 7/1994 | Klassen | B60J 7/085 |
| | | | 296/98 |
| 5,330,246 A * | 7/1994 | Bernardo | B60J 7/068 |
| | | | 160/130 |
| 5,395,061 A * | 3/1995 | Merklinger | B65F 3/00 |
| | | | 241/DIG. 31 |
| 5,697,741 A | 12/1997 | Harris et al. | |
| 5,779,300 A * | 7/1998 | McNeilus | B65F 3/00 |
| | | | 296/183.1 |
| 5,829,946 A | 11/1998 | Mcneilus et al. | |
| 5,931,628 A | 8/1999 | Christenson | |
| 5,938,393 A * | 8/1999 | Georg | B65F 3/001 |
| | | | 414/525.6 |
| 6,227,608 B1 | 5/2001 | Hoyne | |
| 6,290,450 B1 | 9/2001 | Humphries et al. | |
| 6,485,079 B1 | 11/2002 | Brown et al. | |
| 6,499,931 B1 * | 12/2002 | Garrett, Jr. | B65F 3/08 |
| | | | 414/407 |
| 6,527,495 B2 | 3/2003 | Humphries et al. | |
| 6,666,491 B2 | 12/2003 | Schrafel | |
| 6,719,032 B1 * | 4/2004 | Miers | E05F 15/67 |
| | | | 160/209 |
| 6,752,583 B2 * | 6/2004 | Rajewski | B60P 1/36 |
| | | | 414/502 |
| 6,848,734 B1 | 2/2005 | Mulvaney | |
| 6,918,721 B2 | 7/2005 | Venton-Walters et al. | |
| 6,938,960 B1 * | 9/2005 | Eby | B60J 7/1621 |
| | | | 296/100.1 |
| 6,997,506 B2 | 2/2006 | Hecker | |
| 7,055,880 B2 | 6/2006 | Archer | |
| 7,073,847 B2 | 7/2006 | Morrow et al. | |
| 7,118,314 B2 | 10/2006 | Zhou et al. | |
| 7,264,305 B2 | 9/2007 | Kuriakose | |
| 7,370,904 B2 | 5/2008 | Wood et al. | |
| 7,517,005 B2 | 4/2009 | Kuriakose | |
| 7,621,580 B2 | 11/2009 | Randjelovic et al. | |
| 7,823,948 B2 | 11/2010 | Redman et al. | |
| 7,954,882 B2 | 6/2011 | Brummel et al. | |
| 8,152,216 B2 | 4/2012 | Howell et al. | |
| 8,376,439 B2 | 2/2013 | Kuriakose et al. | |
| 8,794,886 B1 | 8/2014 | Nett et al. | |
| 8,876,217 B1 * | 11/2014 | Medlen | B60P 1/286 |
| | | | 296/100.1 |
| 8,967,699 B1 | 3/2015 | Richmond et al. | |
| 9,102,466 B2 * | 8/2015 | Neufeldt | B65F 3/26 |
| 9,174,686 B1 | 11/2015 | Oshkosh | |
| 9,366,507 B1 | 6/2016 | Richmond et al. | |
| 9,493,093 B2 | 11/2016 | Stingle et al. | |
| 9,694,776 B2 | 7/2017 | Nelson et al. | |
| 9,707,869 B1 | 7/2017 | Messina et al. | |
| 9,736,186 B2 | 8/2017 | Zhou | |
| 10,286,239 B2 | 5/2019 | Shively et al. | |
| 10,414,067 B2 | 9/2019 | Datema et al. | |
| 10,545,010 B1 | 1/2020 | Leeman et al. | |
| 10,611,416 B2 | 4/2020 | Groteleuschen et al. | |
| 11,697,331 B2 * | 7/2023 | Rocholl | B60J 7/041 |
| | | | 296/98 |
| 2007/0035152 A1 * | 2/2007 | Talbot | B60J 7/1621 |
| | | | 296/100.1 |
| 2010/0219656 A1 * | 9/2010 | Chenowth | B60J 7/068 |
| | | | 296/98 |
| 2013/0336751 A1 * | 12/2013 | Price | B65F 3/12 |
| | | | 414/407 |
| 2014/0265404 A1 * | 9/2014 | Mulholland | B60P 7/02 |
| | | | 296/100.1 |
| 2015/0098777 A1 * | 4/2015 | Rajewski | B65F 3/001 |
| | | | 414/406 |
| 2015/0130210 A1 | 5/2015 | Fliegl | |
| 2018/0250847 A1 | 9/2018 | Wurtz et al. | |
| 2018/0305119 A1 * | 10/2018 | Struck | E05F 15/60 |
| 2019/0091890 A1 | 3/2019 | Rocholl et al. | |
| 2019/0193934 A1 | 6/2019 | Rocholl et al. | |
| 2019/0262643 A1 | 8/2019 | Shively et al. | |
| 2019/0322321 A1 | 10/2019 | Schwartz et al. | |
| 2020/0078986 A1 | 3/2020 | Clifton et al. | |
| 2020/0102145 A1 | 4/2020 | Nelson et al. | |

* cited by examiner

TOP DOOR FOR ELECTRIC REFUSE VEHICLE

CROSS-REFERENCE TO RELATED PATENT APPLICATIONS

This application is a continuation of U.S. application Ser. No. 16/851,320, filed Apr. 17, 2020, which claims priority to U.S. Provisional Patent Application No. 62/842,928 filed May 3, 2019, which is incorporated herein by reference in its entirety

BACKGROUND

Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

SUMMARY

One embodiment relates to a refuse vehicle. The refuse vehicle includes a chassis, a body assembly coupled to the chassis, an electric energy system, and a door system. The body assembly defines a refuse compartment. The body assembly has a cover that at least partially encloses the refuse compartment such that an opening is defined in the body assembly to provide access to the refuse compartment. The door system is coupled to the cover. The door system includes a panel and an electric actuator powered by the electric energy system. The electric actuator is configured to selectively reposition the panel between a first position where the panel extends across the opening and a second position where the panel does not extend across the opening.

Another embodiment relates to a refuse vehicle. The refuse vehicle includes a chassis, a body assembly coupled to the chassis, an electric energy system, and a door system. The body assembly defines a refuse compartment. The body assembly has a cover that at least partially encloses the refuse compartment such that an opening is defined in the body assembly to provide access to the refuse compartment. The door system is coupled to the cover. The door system includes a flexible panel, a chain linkage coupled to the flexible panel, and an electric actuator. The electric actuator is powered by the electric energy system and configured to selectively reposition the flexible panel between a first position where the flexible panel extends across the opening and a second position where the flexible panel does not extend across the opening.

Another embodiment relates to a refuse vehicle. The refuse vehicle includes a chassis, a body assembly coupled to the chassis, an electric energy system, and a door system. The body assembly defines a refuse compartment having an opening to provide access to the refuse compartment. The door system includes at least one door located at least partially above the door and pivotally coupled to the body assembly by multiple hinges and at least one electric actuator. The electric actuator is configured to selectively reposition the door between a first position where the door extends across the opening and a second position where the door does not extend across the opening.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a refuse vehicle includes a body defining a refuse compartment that is at least partially enclosed by a cover such that a hopper opening is formed to provide access to the refuse compartment (e.g., to dump refuse from a container into the refuse compartment by a lift assembly, etc.). The refuse vehicle includes a door assembly having a door positioned along the cover and an electric actuator. The electric actuator is positioned to facilitate repositioning the door to selectively enclose the hopper opening.

Overall Vehicle

Figure 1:
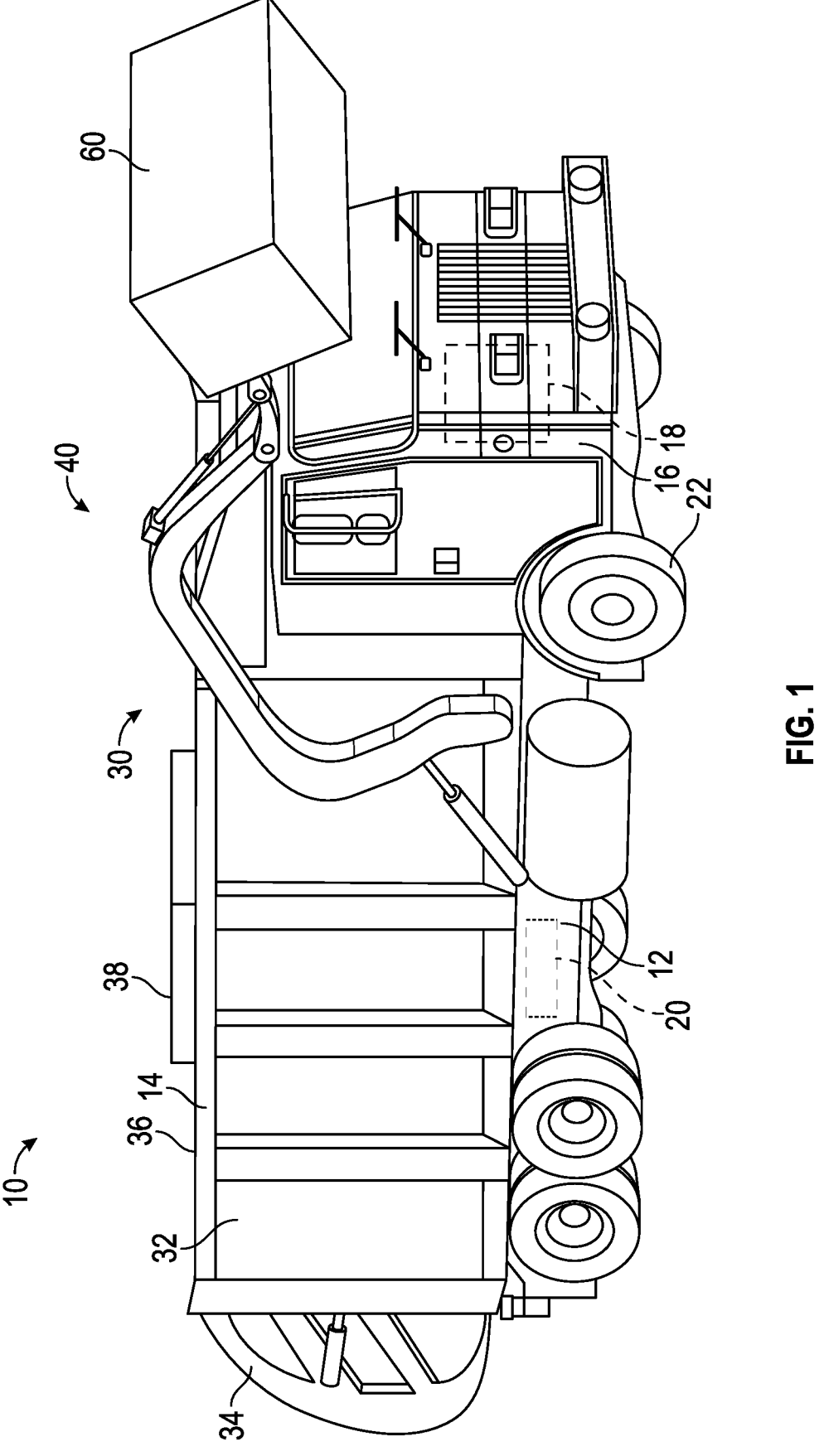
FIG. 1 is a perspective view of a refuse vehicle, according to an exemplary embodiment.

As shown in FIG. 1, a vehicle, shown as refuse vehicle 10 (e.g., a garbage truck, a waste collection truck, a sanitation truck, a recycling truck, etc.), is configured as a front-loading refuse truck. In other embodiments, the refuse vehicle 10 is configured as a side-loading refuse truck or a rear-loading refuse truck. In still other embodiments, the vehicle is another type of vehicle (e.g., a skid-loader, a telehandler, a plow truck, a boom lift, etc.). As shown in FIG. 1, the refuse vehicle 10 includes a chassis, shown as frame 12; a body assembly, shown as body 14, coupled to the frame 12 (e.g., at a rear end thereof, etc.); and a cab, shown as cab 16, coupled to the frame 12 (e.g., at a front end thereof, etc.). The cab 16 may include various components to facilitate operation of the refuse vehicle 10 by an operator (e.g., a seat, a steering wheel, actuator controls, a user interface, switches, buttons, dials, etc.).

As shown in FIG. 1, the refuse vehicle 10 includes a prime mover, shown as electric motor 18, and an energy system, shown as energy storage and/or generation system 20. In other embodiments, the prime mover is or includes an internal combustion engine. According to the exemplary embodiment shown in FIG. 1, the electric motor 18 is coupled to the frame 12 at a position beneath the cab 16. The electric motor 18 is configured to provide power to a plurality of tractive elements, shown as wheels 22 (e.g., via a drive shaft, axles, etc.). In other embodiments, the electric motor 18 is otherwise positioned and/or the refuse vehicle 10 includes a plurality of electric motors to facilitate independently driving one or more of the wheels 22. In still other embodiments, the electric motor 18 or a secondary electric motor is coupled to and configured to drive a hydraulic system that powers hydraulic actuators. According to the exemplary embodiment shown in FIG. 1, the energy storage and/or generation system 20 is coupled to the frame 12 beneath the body 14. In other embodiments, the energy storage and/or generation system 20 is otherwise positioned (e.g., within a tailgate of the refuse vehicle 10, beneath the cab 16, along the top of the body 14, within the body 14, etc.).

According to an exemplary embodiment, the energy storage and/or generation system 20 is configured to (a) receive, generate, and/or store power and (b) provide electric power to (i) the electric motor 18 to drive the wheels 22, (ii) electric actuators of the refuse vehicle 10 to facilitate operation thereof (e.g., lift actuators, tailgate actuators, packer actuators, grabber actuators, etc.), and/or (iii) other electrically operated accessories of the refuse vehicle 10 (e.g., displays, lights, etc.). The energy storage and/or generation system 20 may include one or more rechargeable batteries (e.g., lithium-ion batteries, nickel-metal hydride batteries, lithium-ion polymer batteries, lead-acid batteries, nickel-cadmium batteries, etc.), capacitors, solar cells, generators, power buses, etc. In one embodiment, the refuse vehicle 10 is a completely electric refuse vehicle. In other embodiments, the refuse vehicle 10 includes an internal combustion generator that utilizes one or more fuels (e.g., gasoline, diesel, propane, natural gas, hydrogen, etc.) to generate electricity to charge the energy storage and/or generation system 20, power the electric motor 18, power the electric actuators, and/or power the other electrically operated accessories (e.g., a hybrid refuse vehicle, etc.). For example, the refuse vehicle 10 may have an internal combustion engine augmented by the electric motor 18 to cooperatively provide power to the wheels 22. The energy storage and/or generation system 20 may thereby be charged via an on-board generator (e.g., an internal combustion generator, a solar panel system, etc.), from an external power source (e.g., overhead power lines, mains power source through a charging input, etc.), and/or via a power regenerative braking system, and provide power to the electrically operated systems of the refuse vehicle 10. In some embodiments, the energy storage and/or generation system 20 includes a heat management system (e.g., liquid cooling, heat exchanger, air cooling, etc.).

According to an exemplary embodiment, the refuse vehicle 10 is configured to transport refuse from various waste receptacles within a municipality to a storage and/or processing facility (e.g., a landfill, an incineration facility, a recycling facility, etc.). As shown in FIG. 1, the body 14 includes a plurality of panels, shown as panels 32, a tailgate 34, and a cover 36. The panels 32, the tailgate 34, and the cover 36 define a collection chamber (e.g., hopper, etc.), shown as refuse compartment 30. Loose refuse may be placed into the refuse compartment 30 where it may thereafter be compacted (e.g., by a packer system, etc.). The refuse compartment 30 may provide temporary storage for refuse during transport to a waste disposal site and/or a recycling facility. In some embodiments, at least a portion of the body 14 and the refuse compartment 30 extend above or in front of the cab 16. According to the embodiment shown in FIG. 1, the body 14 and the refuse compartment 30 are positioned behind the cab 16. In some embodiments, the refuse compartment 30 includes a hopper volume and a storage volume. Refuse may be initially loaded into the hopper volume and thereafter compacted into the storage volume. According to an exemplary embodiment, the hopper volume is positioned between the storage volume and the cab 16 (e.g., refuse is loaded into a position of the refuse compartment 30 behind the cab 16 and stored in a position further toward the rear of the refuse compartment 30, a front-loading refuse vehicle, a side-loading refuse vehicle, etc.). In other embodiments, the storage volume is positioned between the hopper volume and the cab 16 (e.g., a rear-loading refuse vehicle, etc.).

As shown in FIG. 1, the refuse vehicle 10 includes a lift mechanism/system (e.g., a front-loading lift assembly, etc.), shown as lift assembly 40, coupled to the front end of the body 14. In other embodiments, the lift assembly 40 extends rearward of the body 14 (e.g., a rear-loading refuse vehicle, etc.). In still other embodiments, the lift assembly 40 extends from a side of the body 14 (e.g., a side-loading refuse vehicle, etc.). As shown in FIG. 1, the lift assembly 40 is configured to engage a container (e.g., a residential trash receptacle, a commercial trash receptacle, a container having a robotic grabber arm, etc.), shown as refuse container 60. The lift assembly 40 may include various actuators (e.g., electric actuators, hydraulic actuators, pneumatic actuators, etc.) to facilitate engaging the refuse container 60, lifting the refuse container 60, and tipping refuse out of the refuse container 60 into the hopper volume of the refuse compartment 30 through an opening in the cover or through the tailgate 34. The lift assembly 40 may thereafter return the empty refuse container 60 to the ground. According to an exemplary embodiment, a door, shown as top door 38, is movably coupled along the cover 36 to seal the opening thereby preventing refuse from escaping the refuse compartment 30 (e.g., due to wind, bumps in the road, etc.).

Door System

Figure 2:
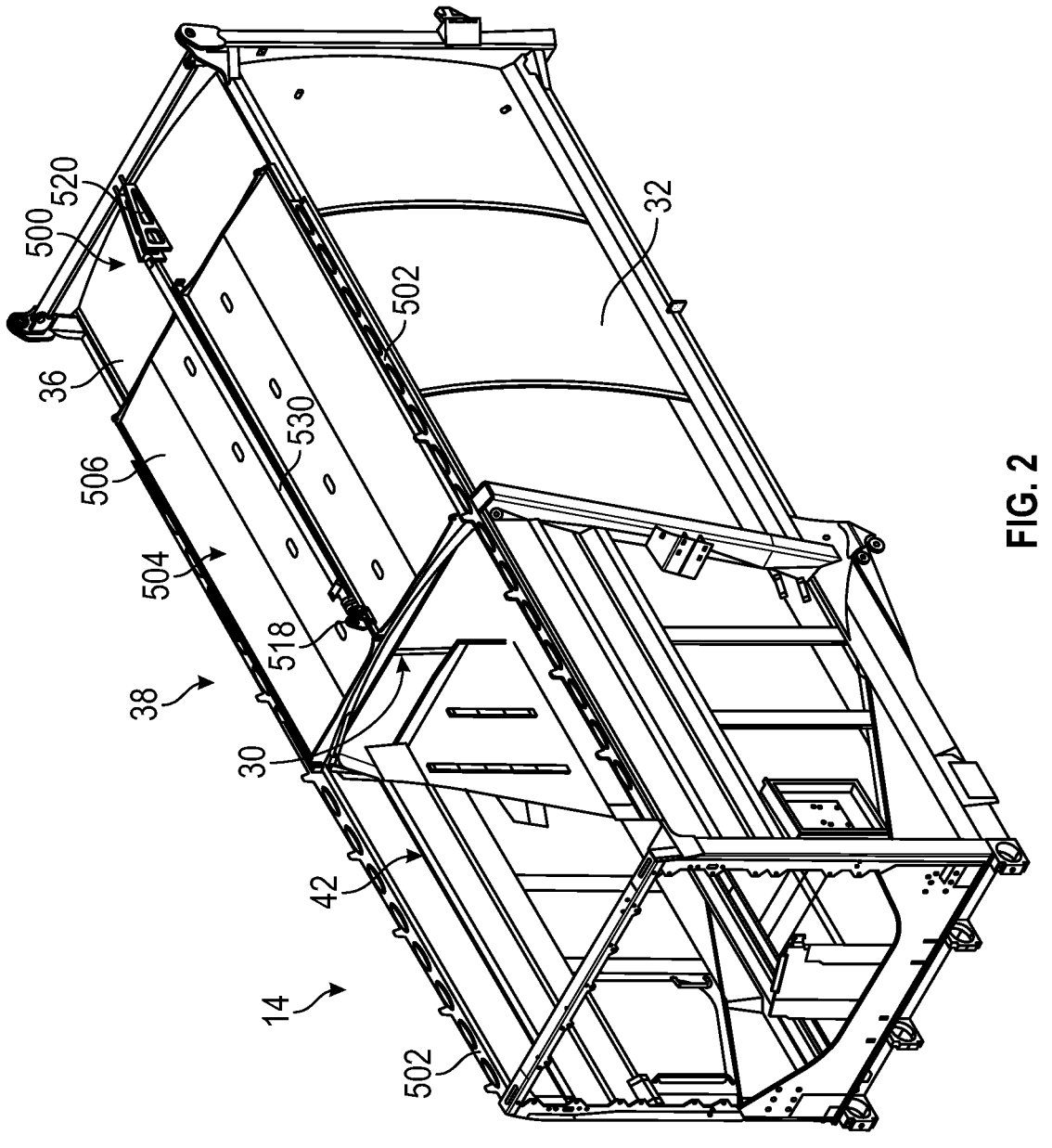
FIG. 2 is a perspective view of a first door system for the refuse vehicle of FIG. 1, according to an exemplary embodiment.

According to the exemplary embodiment shown in FIG. 2, the lift assembly 40 is configured to facilitate lifting the refuse container 60 to dump the contents therein (e.g., trash, recyclables, etc.) into the refuse compartment 30 through an opening, shown as hopper opening 42, in the cover 36 of the body 14. As shown in FIGS. 2-6, the top door 38 of the refuse vehicle 10 includes a door assembly or system, shown as top door system 500. According to an exemplary embodiment, the top door system 500 is configured to facilitate selectively opening and closing the hopper opening 42 to seal the cover 36 to prevent refuse from escaping the refuse compartment 30.

Figure 3:
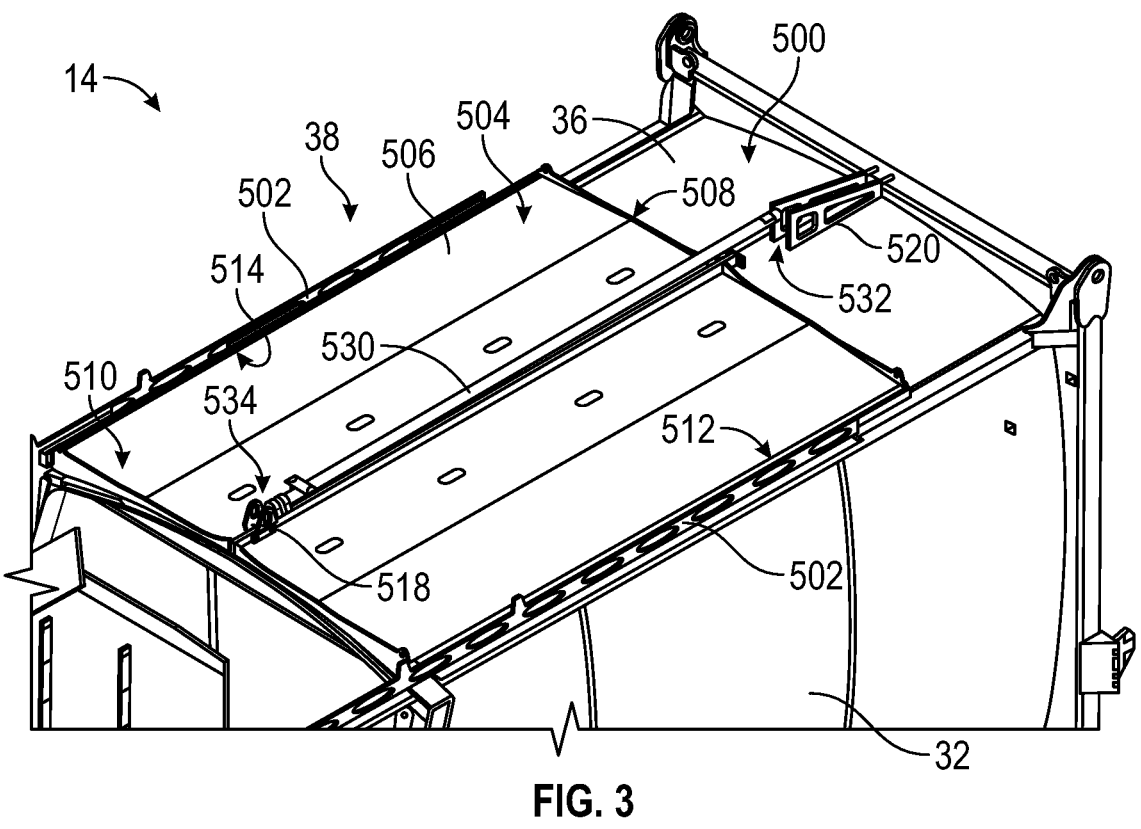
FIG. 3 is another perspective view of the first door system for the refuse vehicle of FIG. 1.
Figure 4:
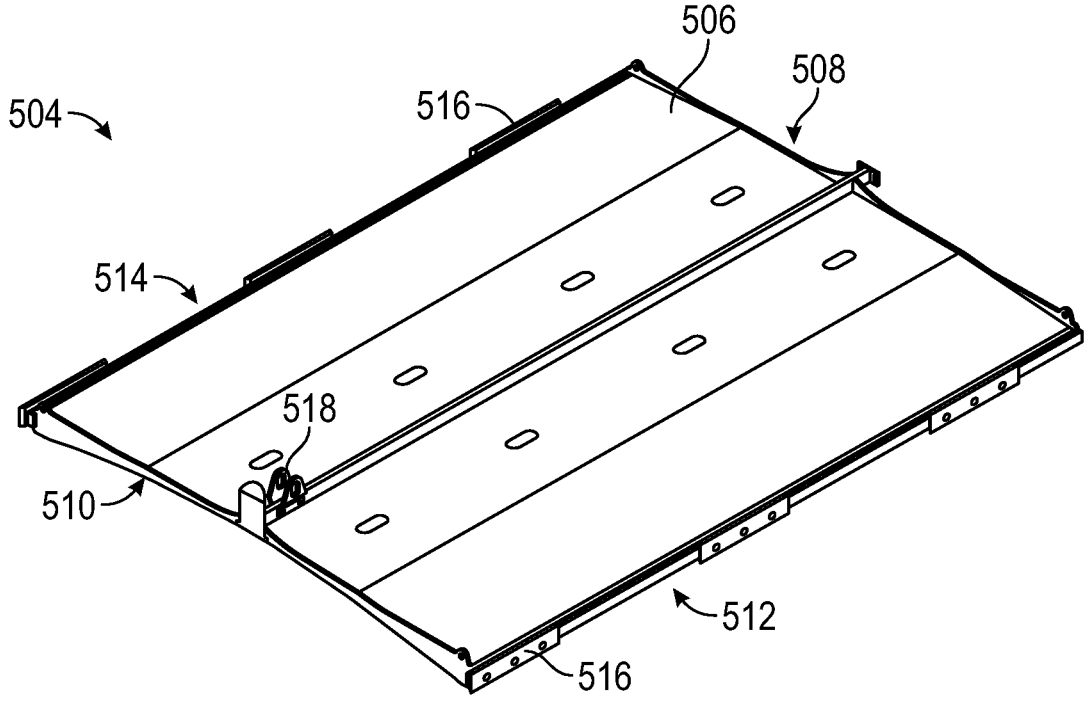
FIG. 4 is a perspective view of a door of the door system of FIG. 3.

According to the exemplary embodiment shown in FIGS. 2-4, the top door system 500 is configured as a first door system. As shown in FIGS. 2-4, the top door system 500 includes a pair of track elements, shown as tracks 502, extending at least partially along the length of each longitudinal edge of the cover 36 and the hopper opening 42; a movable door, shown as door 504, coupled to the tracks 502 and slidable therealong; and an actuator, shown as door actuator 530, positioned to facilitate selectively repositioning the door 504 between an open position where the hopper opening 42 is accessible (as shown in FIG. 2) and closed position where the hopper opening 42 is sealed (and/or covered).

As shown in FIGS. 2-4, the door 504 includes a panel (e.g., hopper cover, etc.), shown as door panel 506, having a first end, shown as rear end 508, an opposing second end, shown as front end 510, a first longitudinal edge, shown as left side 512, and an opposing second longitudinal edge, shown as right side 514. In one embodiment, the door panel 506 is manufactured from a rigid material (e.g., metal, plastic, etc.). In another embodiment, the door panel 506 is manufactured from a flexible material (e.g., a cloth material, etc.). In such an embodiment, the door 504 may include a rigid frame that supports the flexible material.

As shown in FIG. 4, the door 504 includes interfaces, shown as sliding interfaces 516, spaced along the left side 512 and the right side 514 of the door panel 506. According to an exemplary embodiment, the sliding interfaces 516 are configured to engage with the tracks 502 to facilitate sliding the door panel 506 between the open position and the closed position. As shown in FIGS. 2-4, the door 504 includes a first interface, shown as front actuator interface 518, positioned along a longitudinal centerline of the door panel 506 and proximate the front end 510 thereof. In other embodiments embodiment, the front actuator interface 518 is positioned at proximate a midpoint of the door panel 506 or proximate the rear end 508 of the door panel 506.

As shown in FIGS. 2 and 3, the top door system 500 includes a second interface (e.g., a bracket, etc.), shown as rear actuator interface 520, coupled to and extending from the cover 36, proximate the rear end of the body 14. As shown in FIG. 3, the door actuator 530 includes a first end, shown as rear end 532, and an opposing second end, shown as front end 534. As shown in FIGS. 2 and 3, the rear end 532 of the door actuator 530 is coupled to the rear actuator interface 520 positioned on the cover 36 and the front end 534 of the door actuator 530 is coupled to the front actuator interface 518 of the door panel 506 such that the door actuator 530 extends from the rear actuator interface 520, past the rear end 508 of the door panel 506, and to the front actuator interface 518. According to an exemplary embodiment, the door actuator 530 is a linear actuator configured to extend and retract to reposition the door panel 506 between the open position and the closed position. According to an exemplary embodiment, the door actuator 530 is an electric actuator configured to be powered via electricity provided by the energy storage and/or generation system 20 or another electrical source on the refuse vehicle 10 (e.g., a generator, solar panels, etc.). In one embodiment, the door actuator 530 is or includes a ball screw driven by an electric motor. In other embodiments, another type of electrically driven, linear actuator is used (e.g., a lead screw actuator, etc.). In an alternative embodiment, the door actuator 530 is a hydraulic cylinder driven by an electronically driven hydraulic pump (e.g., driven by the electric motor 18, the secondary electric motor, etc.). In another alternative embodiment, the door actuator 530 is a rotational electric actuator (e.g., an electric motor, etc.) and the top door system 500 includes a chain or belt element coupled between the door actuator 530 and the door 504 to facilitate moving the door panel 506 (e.g., similar to a garage door, etc.).

Figure 5:
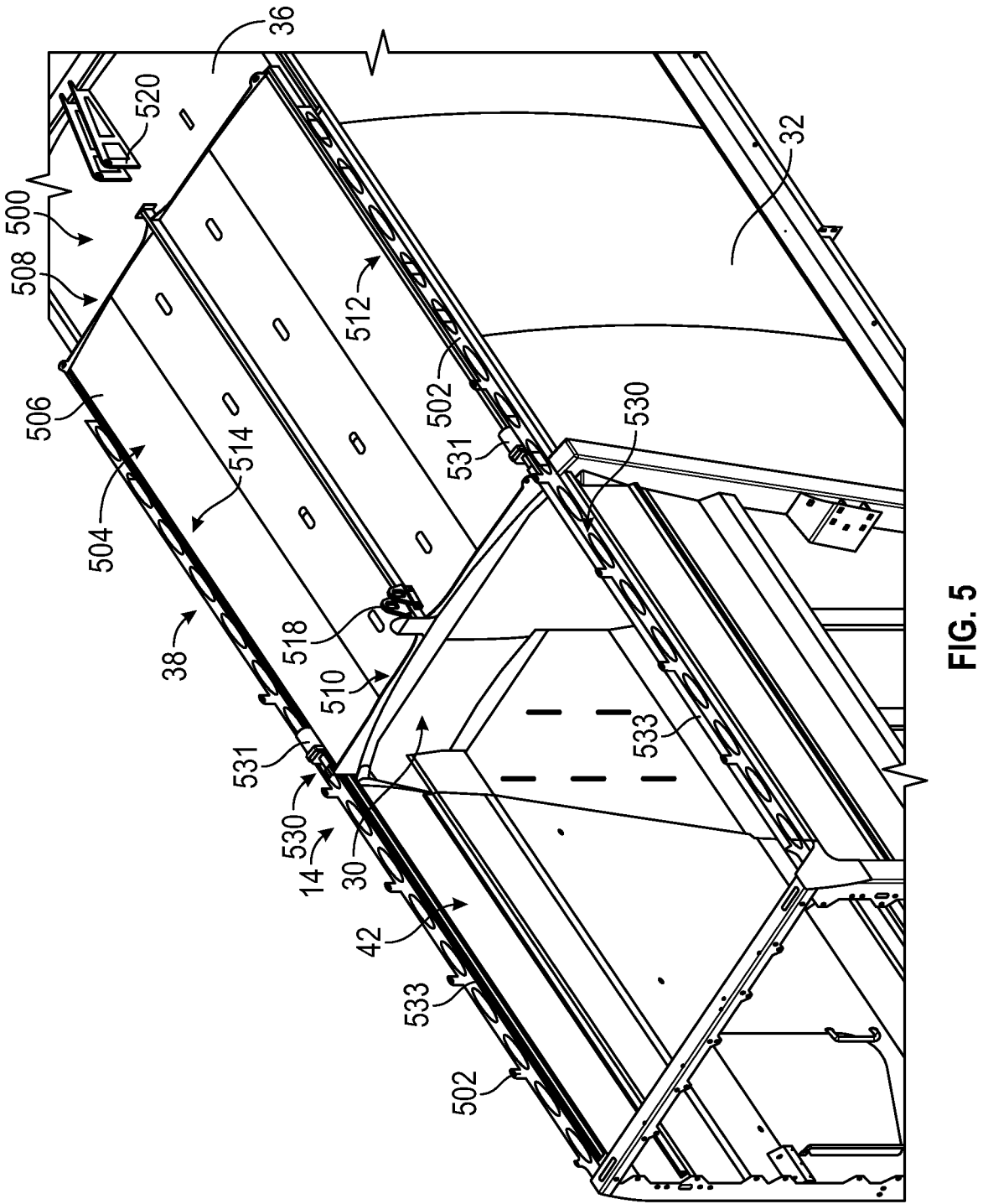
FIG. 5 is a perspective view of a second door system for the refuse vehicle of FIG. 1, according to an exemplary embodiment.

According to the exemplary embodiment shown in FIG. 5, the top door system is configured as a second door system to be used in place of the first door system of FIGS. 2-4. As shown in FIG. 5, the top door system 500 is similar to the first door system of FIGS. 2-4 and therefore similar reference numerals are used. For example, the top door system 500 includes the pair of tracks 502 and the door 504. However, the top door system 500 further includes a second door actuator 530, and the door actuators 530 are located in different locations compared to the first door system. The first door actuator 530 and the second door actuator 530 are located proximate to the front end 510 and opposed across the panel 506 (one located proximate the left side 512 and one located proximate the right side 514). The first door actuator 530 and the second door actuator 530 each include an electric motor 531 having threads and a screw 533. Each electric motor 531 is coupled to the door 504 at an opposed end from one another.

In operation, each electric motor 531 is powered by the energy storage and/or generation system 20 at the same time (e.g., each electric motor 531 operates in synchronization, driving the respective screws 533 at the same time and in the same direction), and the threads of the electric motor 531 receive or provide the respective screw 533. In this way, as the motors 531 (and the door 504 coupled thereto) receive or provide the respective screw 533, the door 504 moves. The motors 531 will continue to move until they encounter either end of the screw 533. At this point, the electric motor 531 may include a limit switch (or similar means) that prevents it from moving in the direction of the encountered end of the screw 533. This may prevent damage to both the screw 533 and the electric motor 531. In this way, the door 504 is selectively movable between an open position (a second position) where the hopper opening 42 is accessible (not covered) and a closed position (a first position) where the hopper opening 42 is sealed (and/or covered). While the first door actuator 530 and the second door actuator 530 are shown to be ball screw actuators, other types of actuators are possible. In an alternative embodiment, the door actuators 530 are a hydraulic cylinder driven by an electronically driven hydraulic pump (e.g., driven by the electric motor 18, the secondary electric motor, etc.). In another alternative embodiment, the door actuators 530 are a rotational electric actuator (e.g., an electric motor, etc.) and the top door system 500 includes a chain or belt element coupled between the door actuator 530 and the door 504 to facilitate moving the door panel 506 (e.g., similar to a garage door, etc.).

Figure 6:
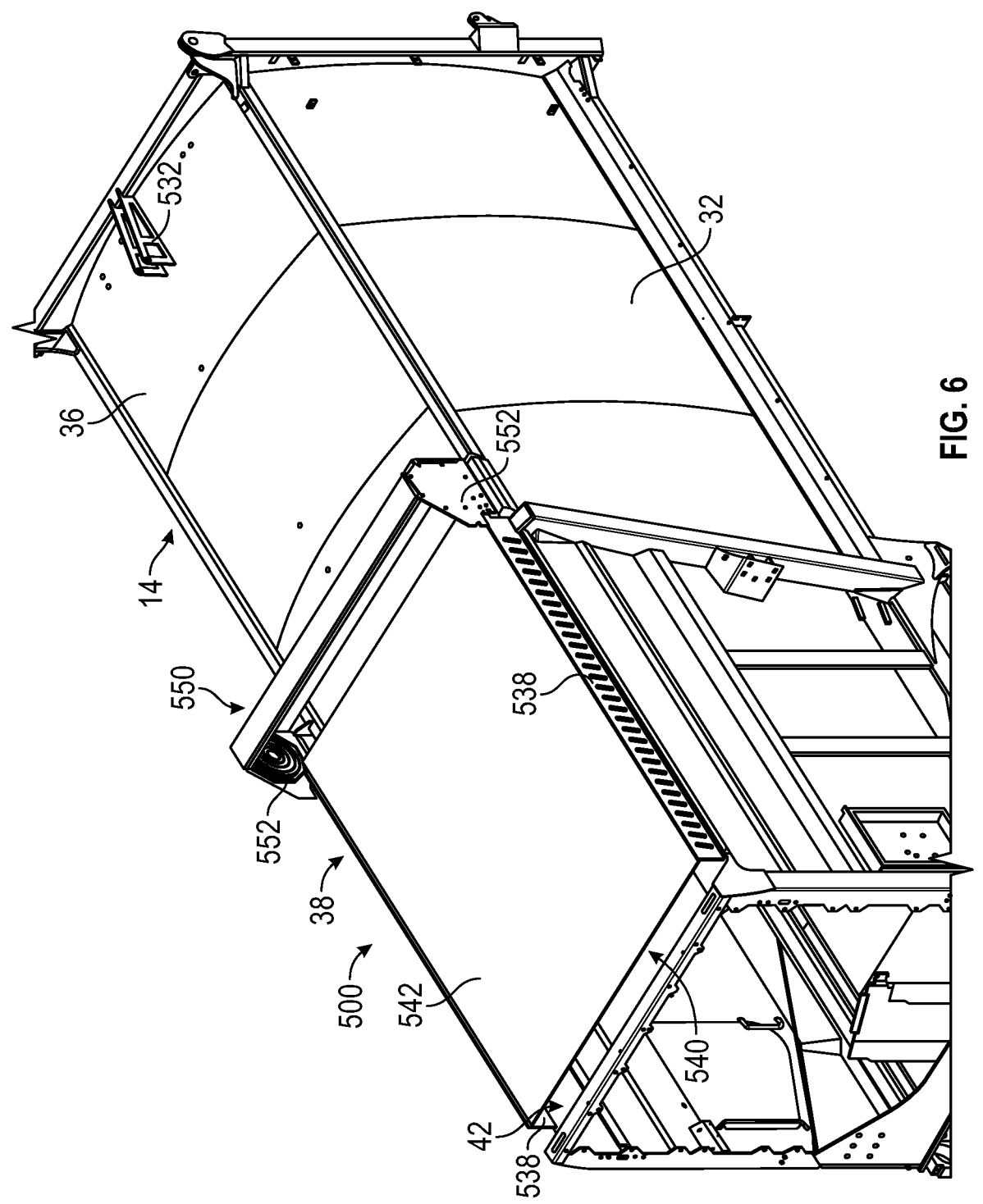
FIG. 6 is a perspective view of a third door system for the refuse vehicle of FIG. 1, according to an exemplary embodiment.
Figure 7:
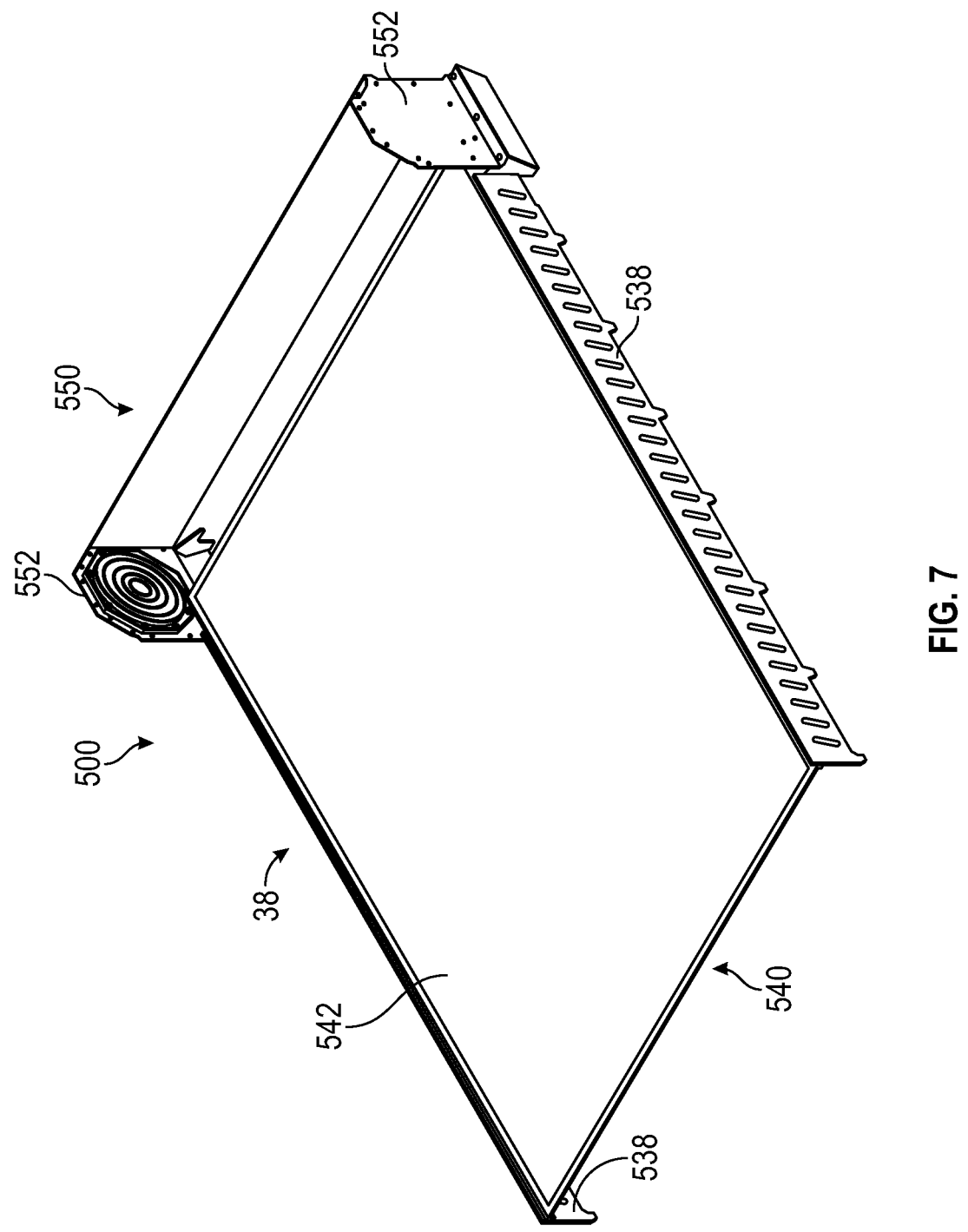
FIG. 7 is a perspective view of a door of the third door system of FIG. 6.
Figure 8:
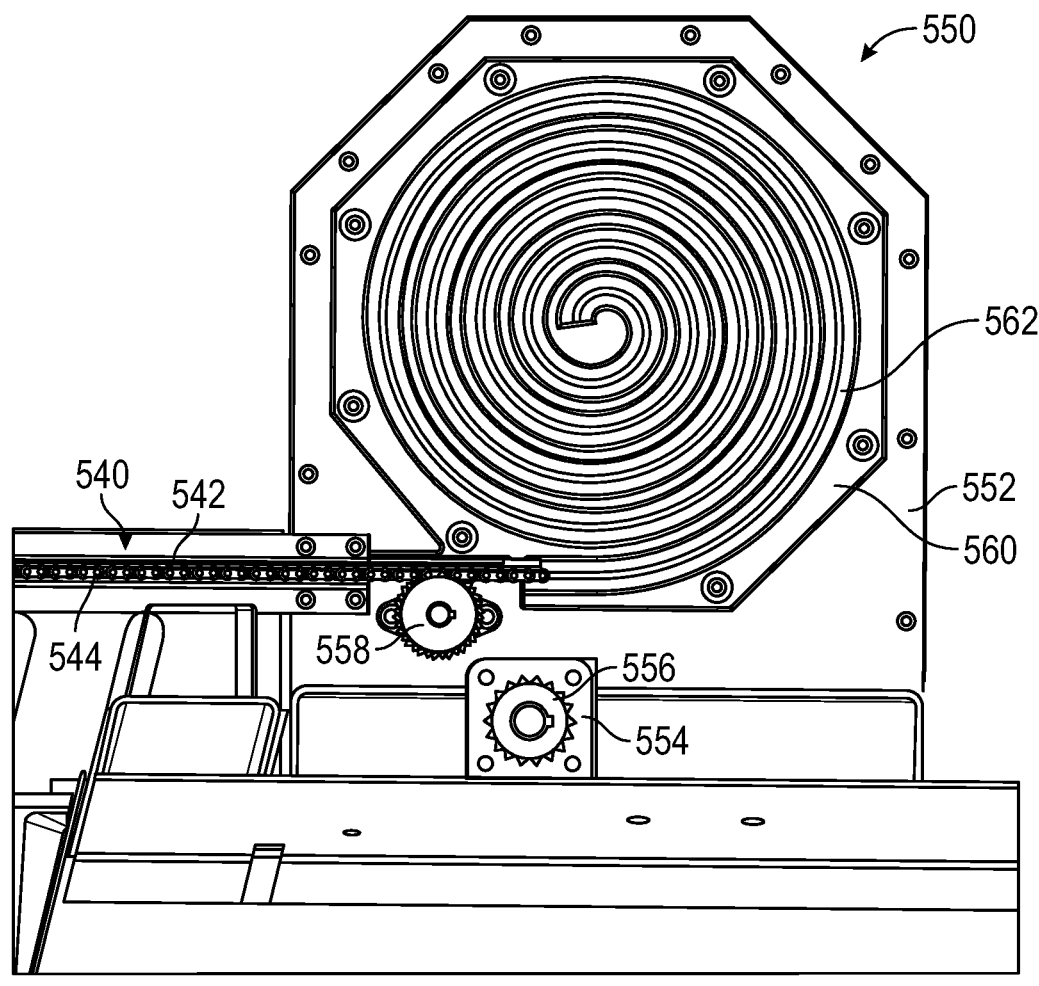
FIG. 8 is a side view of a panel housing of the third door system of FIG. 6.

According to the exemplary embodiment shown in FIGS. 6-8, the top door system 500 is configured as a third door system to be used in place of the first door system of FIGS. 2-4. As shown in FIG. 5, the top door system 500 includes a pair of track elements, shown as tracks 538. According to an exemplary embodiment, the tracks 538 are configured to extend at least partially along the length of each longitudinal edge of the cover 36 and the hopper opening 42 (e.g., similar to the tracks 502, etc.). As shown in FIGS. 6-8, the top door system 500 includes a movable door, shown as door 540, having a panel (e.g., a cloth panel, hopper cover, etc.), show as flexible panel 542, and a linkage, shown as chain linkage 544, coupled along at least one longitudinal edge of the flexible panel 542. According to an exemplary embodiment, the chain linkage 544 is positioned to facilitate selectively repositioning the flexible panel 542 between an open position (a second position) where the hopper opening 42 is accessible (not covered) and a closed position (a first position) where the hopper opening 42 is sealed (and/or covered).

As shown in FIGS. 6-8, the top door system 500 includes a housing, shown as panel housing 550, having supports, shown as end plates 552. According to an exemplary embodiment, the end plates 552 are configured to facilitate coupling the panel housing 550 to the cover 36 of the body 14. As shown in FIG. 6, the top door system 500 include an actuator assembly including an actuator, shown as door actuator 554, disposed within the panel housing 550; a first gear, shown as output gear 556, coupled to an output of the door actuator 554; and a second gear, shown as drive gear 558, in engagement with the chain linkage 544. According to an exemplary embodiment, the output gear 556 is configured to directly engage the drive gear 558 to facilitate driving the chain linkage 544 with the door actuator 554. In one embodiment, the output gear 556 has a smaller diameter than the drive gear 558. In another embodiment, the output gear 556 has a larger diameter than the drive gear 558. In other embodiments, the actuator assembly has more than two gears. In other embodiments, actuator assembly has variable gearing (e.g., a gearbox, a transmission, etc.). In yet other embodiments, the actuator assembly has a planetary gear set. In some embodiments, the output gear 556 is configured as a screw gear. In such embodiments, the door actuator 554 may be oriented perpendicular to the orientation shown in FIG. 8.

In some embodiments, the actuator assembly does not include the drive gear 558. In such embodiments, the output gear 556 may be in direct engagement with the chain linkage 544. In some embodiments, the actuator assembly includes a pulley assembly where the output gear 556 is replaced with a first pulley or sheave, the drive gear 558 is connected to a second pulley or sheave, and a connector (e.g., a belt, a chain, etc.) couples the first pulley to the second pulley to facilitate driving the chain linkage 544 with the door actuator 554. In other embodiments, the pulley assembly has more than two pulleys (e.g., a third pulley, a tensioner, etc.). In still other embodiments, the pulley assembly is a variable pulley assembly (e.g., a continuously variable transmission ("CVT"), etc.).

According to an exemplary embodiment, the door actuator 554 is an electric actuator configured to be powered via electricity provided by the energy storage and/or generation system 20 or another electrical source on the refuse vehicle 10 (e.g., a generator, solar panels, etc.). In an alternative embodiment, the door actuator 554 is a hydraulic actuator driven by an electronically driven hydraulic pump (e.g., driven by the electric motor 18, the secondary electric motor, etc.). In some embodiments, the top door system 500 includes an actuator assembly positioned on each side of the door 540. In some embodiments, the top door system 500 includes a single actuator assembly position on one of side of the door 540.

As shown in FIG. 8, the panel housing 550 includes interfaces, shown as panel interfaces 560, coupled to the end plates 552 and positioned within the interior of the panel housing 550. The panel interfaces 560 define a groove, shown as panel track 562, having a circular/spiral shape that receives and winds up or rolls the flexible panel 542 and the chain linkage 544 as the door actuator 554 drives the door 540 into the open position. When wound up, the chain linkage 544 and the flexible panel 542 form a generally circular/spiral shape. Additionally, as the chain linkage 544 needs to provide a push force to drive the door 540 into the open position, the chain must be relatively stiff. In one embodiment, the chain linkage 544 is a push chain that is relatively stiff. In another embodiment, the chain linkage 544 is a normal chain that rides within a track, the track keeping the chain linkage 544 straight to provide a pushing or pulling while it is moving along the tracks 538.

Figure 9:
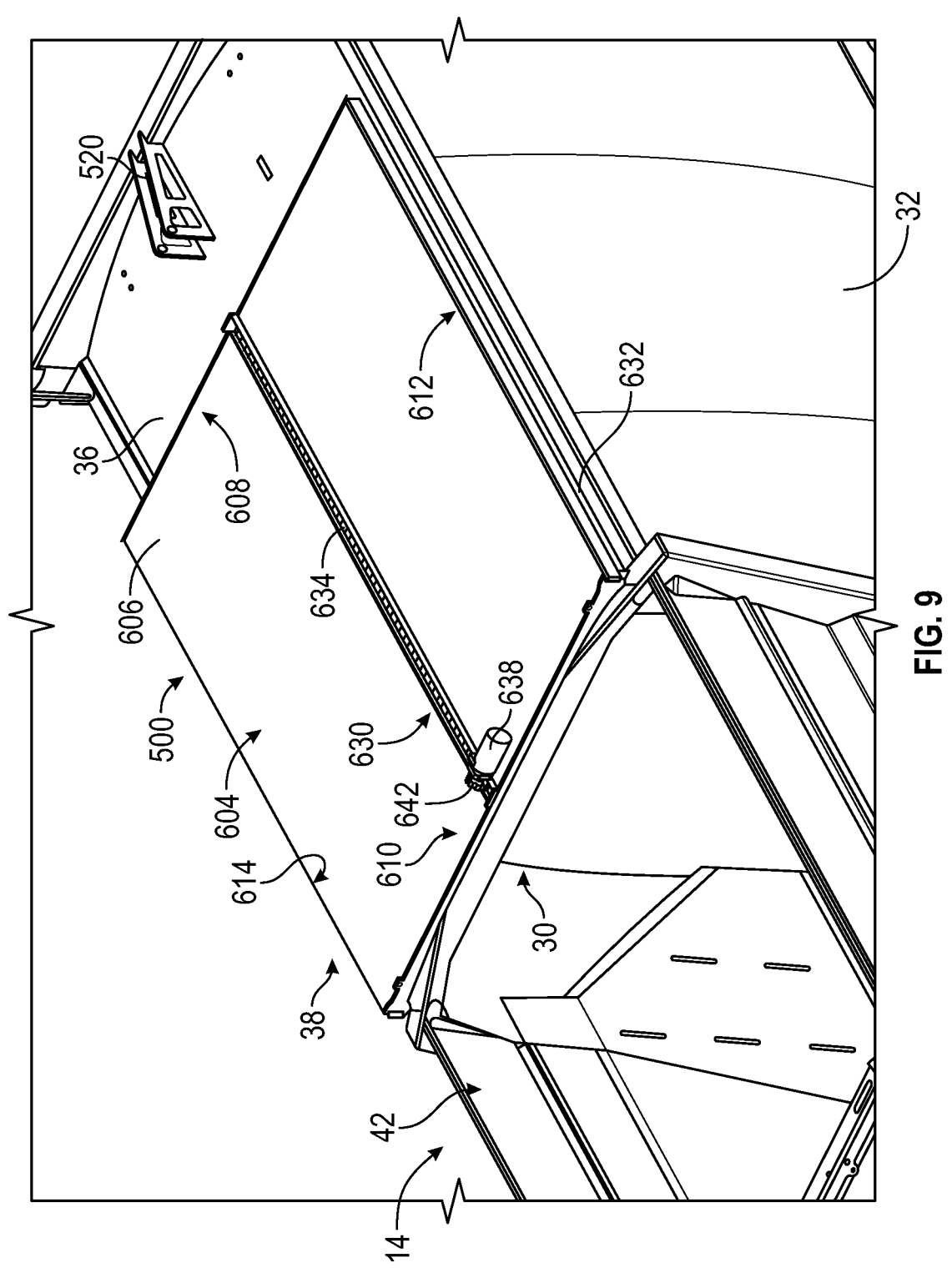
FIG. 9 is a perspective view of a fourth door system for the refuse vehicle of FIG. 1, according to an exemplary embodiment.

According to the exemplary embodiment shown in FIG. 9, the top door system 500 is configured as a fourth door system to be used in place of the first door system of FIGS. 2-4. As shown in FIG. 9, the top door system 500 includes a pair of track elements, shown as tracks 632 (only one side can be seen in FIG. 9). According to an exemplary embodiment, the tracks 632 extend at least partially along the length of each longitudinal edge of the cover 36. In some embodiments, the tracks 632 further extend along the length of the hopper opening 42 (similar length to the tracks 502). As shown in FIG. 9, the top door system 500 includes a movable door, shown as door 604, having one or more panels, shown as panel 606. The panel 606 includes a front end 610, a rear end 608, and two sides (e.g., a left side 612 and a right side 614). While it is not shown, the door 604 further includes one or more sliding interfaces that allow the door 604 to move along the tracks 632.

The top door system 500 further includes a rack and pinion system 630 coupled to the door 604. The rack and pinion system includes a rack 634 coupled to the panel 606 along a proximate midline (between the front end 610 and the rear end 608), an electric motor 638, and a pinion 642 rotatably coupled to the electric motor 638 and movably coupled to the rack 634. The electric motor 638 is electrically coupled to the energy storage and/or generation system 20 to receive electrical power. The electric motor 638 is configured to transform the electrical power into mechanical torque through an output shaft. The pinion 642 is then rotatably coupled to the electric motor 638 to receive and transmit the torque. Both the pinion 642 and the rack 634 have the same diametral pitch and include multiple gear teeth in contact. In this way, the teeth of the rack 634 and the pinion 642 mesh, and the torque of the pinion 642 is transferred into a linear force to the rack 634. This linear force is along the length of the rack 634. In some embodiments, the pinion 642 and the rack 634 have a gear ratio that provides additional torque to the rack 634. For example, the rack 634 and pinion 642 may have a gear ratio of 1:2, that is the rack 634 receives twice the torque of the pinion 642.

In operation, the electric motor 638 is powered by the energy storage and/or generation system 20 and provides torque to (drives) the pinion 642. The pinion 642 is in contact with the rack 634 and transmits a linear force to the rack 634. In this way, the rack 634 and the door 604 coupled thereto selectively moves in a straight line along the tracks 632 between an open position (second position) where the hopper opening 42 is accessible (not covered) and a closed position (first position) where the hopper opening 42 is sealed (and/or covered). In some embodiments, when the pinion 642 reach an end of the rack 634, the electric motor 638 includes a limit switch (or similar means) that prevents it from providing any more torque to the pinion 642. This may prevent damage to the entire rack and pinion system 630. In even other embodiments, if the pinion 642 reaches an end of the rack 634 the two will disengage from one another to prevent damage to the rack and pinion system.

While the top door system 500 is shown to include a single rack and pinion system 630 located along a longitudinal centerline of the panel 606, the top door system 500 may include two or more rack and pinion systems 630 located in various other locations on the panel 606. In one alternative embodiment (similar to the second door system), the top door system 500 include two opposed rack and pinion systems 630 located along the sides of the panel 606 (e.g., the right side 614 and the left side 612). In this way, the door 604 may receive twice the linear force as compared to a system with a single rack and pinion system 630. Additionally in a system with two rack and pinion systems 630, the multiple electric motors 638 may need to operate in synchronization. In even other embodiments, the tracks 632 include one or more roller bearings, which reduces friction between the sliding interface of the door 604 and the tracks 632.

Figure 10:
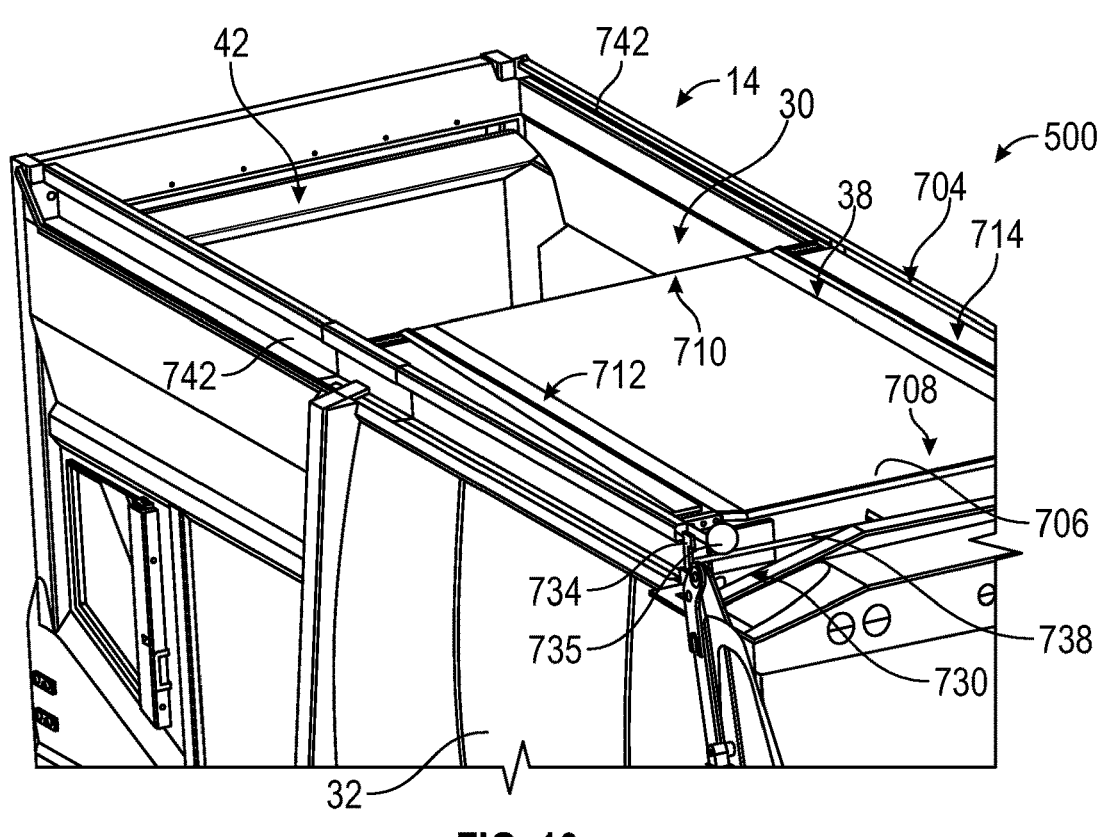
FIG. 10 is a perspective view of a fifth door system for the refuse vehicle of FIG. 1 in an open position, according to an exemplary embodiment.
Figure 11:
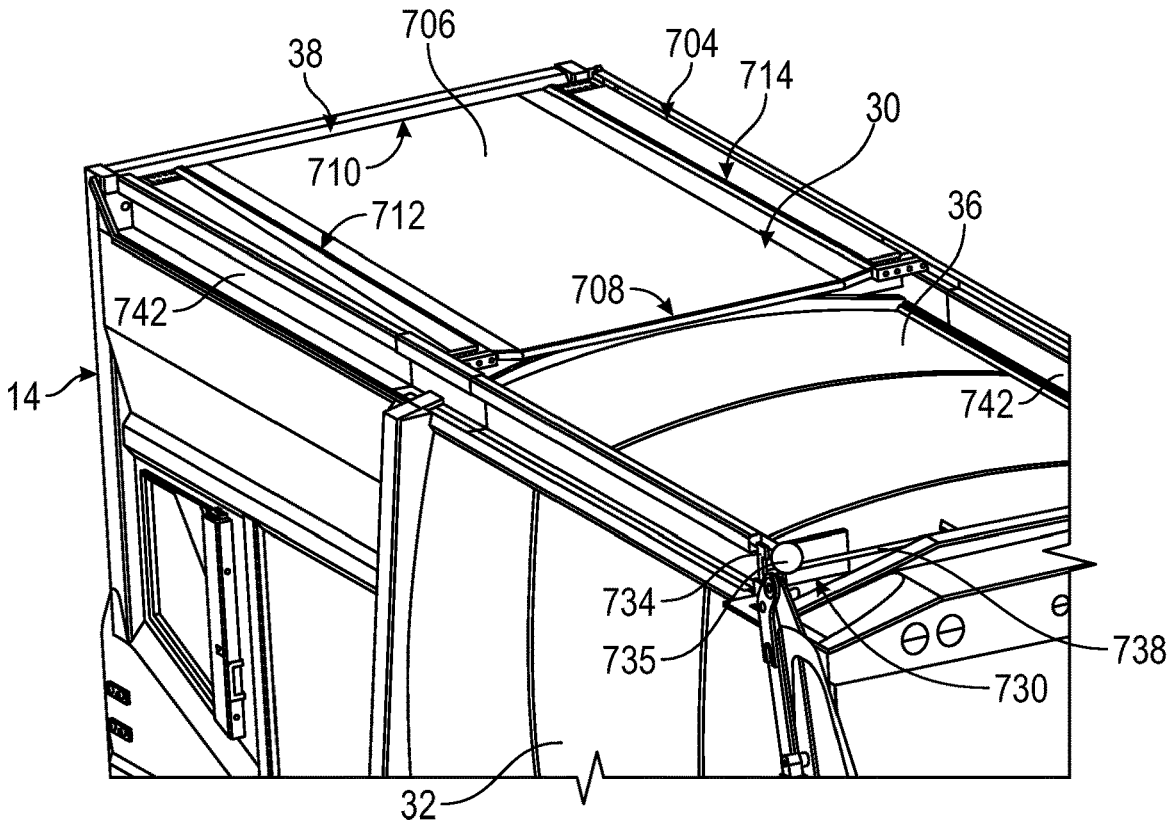
FIG. 11 is a perspective view of the fifth door system in a closed position.
Figure 12:
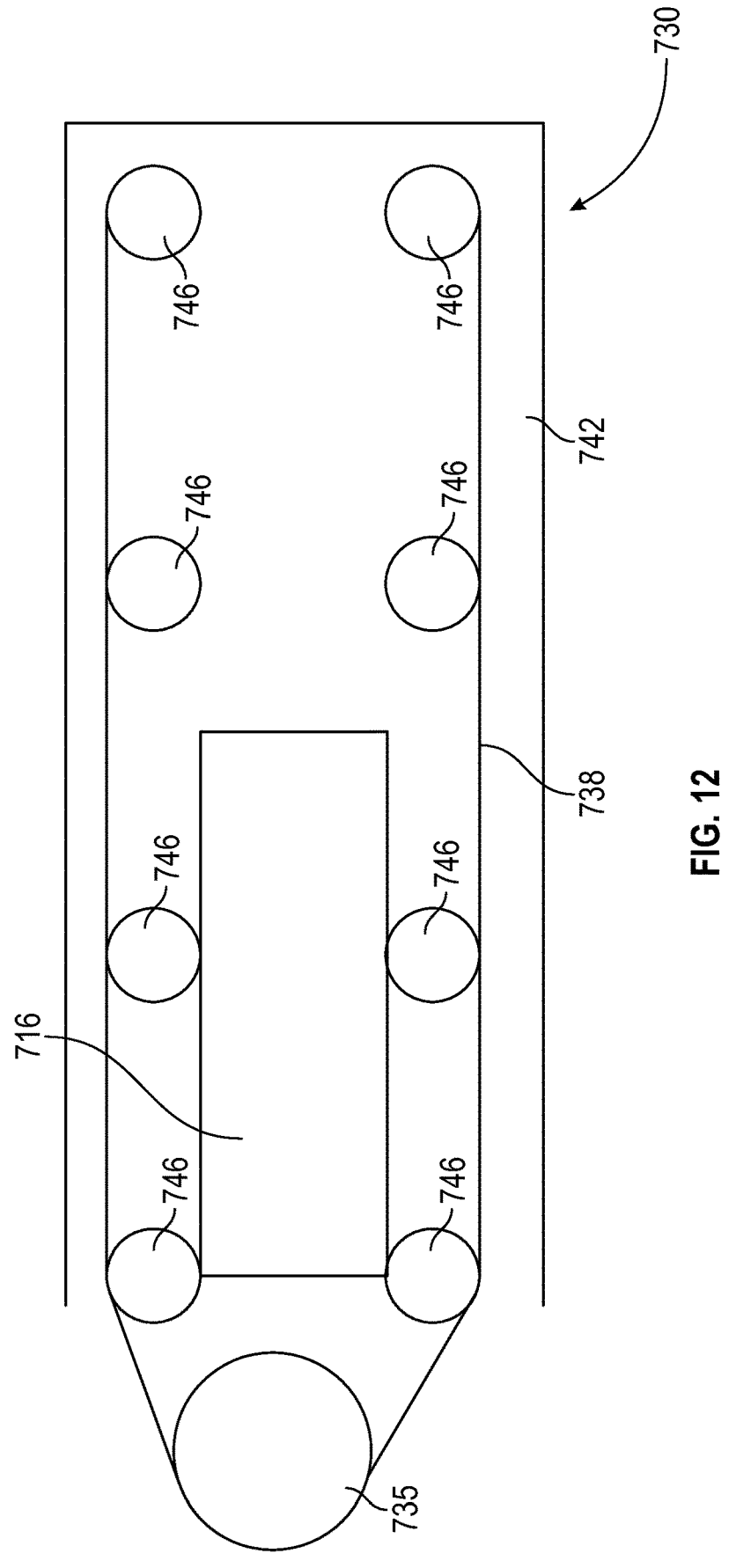
FIG. 12 is an illustrative view of a track and pulley system of the fifth door system of FIG. 10.

According to the exemplary embodiment shown in FIGS. 10-12, the top door system 500 is configured as a fifth door system to be used in place of the first door system of FIGS. 2-4. As shown in FIGS. 10-12, the top door system 500 includes a pair of track elements, shown as tracks 742. According to an exemplary embodiment, the tracks 742 extend at least partially along the length of each longitudinal edge of the cover 36 and the hopper opening 42 (similar to the tracks 502). The top door system 500 includes a movable door, shown as door 704, having one or more panels, shown as panel 706. The panel 706 includes a front end 710, a rear end 708, and two sides (e.g., a left side 712 and a right side 714). The door 704 further includes one or more sliding interfaces 716.

The top door system 500 further includes a cable and pulley track system 730. The cable and pulley track system 730 includes an electric motor 734 coupled to the body 14, a drive pulley 735 rotatably coupled to the electric motor 734, multiple roller pulleys 746, and a cable or belt 738 coupled to the drive pulley 735 and the roller pulleys 746. The cable and pulley track system 730 extends longitudinally along either side (e.g., the right side 714 or the left side 712) of the panel 706. The electric motor 734 is electrically coupled to the energy storage and/or generation system 20 to receive electrical power and is configured to transform the electrical power into mechanical torque through an output shaft. The drive pulley 735 is rotatably coupled to and receives the torque from the electric motor 734. The cable 738 is coupled to and rotates about the drive pulley 735 to provide torque to the roller pulleys 746. The roller pulleys 746 are snuggly fit against the top and the bottom of sliding interface 716 to provide power thereto. As a result, when the roller pulleys 746 rotate about their respective axis, the sliding interface 716 and the door 704 move.

In operation and as shown in FIG. 12, the electric motor 734 receives power from the energy storage and/or generation system 20. The electric motor 734 then converts the electric power into torque and transfers the torque along the output shaft to the drive pulley 735. The drive pulley 735 powers the cable 738 which then powers the roller pulleys 746. As the roller pulleys 746 rotates about their respective axis, the sliding interface 716 moves linearly. In this way, the door 704 is capable of selectively moving between an open position (a second position shown in FIG. 10) where the hopper opening 42 is accessible (not covered) and a closed position (a first position shown in FIG. 11) where the hopper opening 42 is sealed (and/or covered). In some embodiments, the sliding interface 716 may include one or more gear teeth (similar to the rack 634) along which teeth of the roller pulleys 746 may catch to move the sliding interface 716. In other embodiments, only one of the top and the bottom of the sliding interface 716 are in contact with the roller pulleys 746.

While the top door system 500 is shown to include a single cable and pulley track system 730 located along a side of the panel 706, the top door system 500 may include two or more cable and pulley track systems 730 located in various other locations on the panel 706. In one alternative embodiment (similar to the second door system), the top door system 500 include two opposed cable and pulley track systems 730 located along the sides of the panel 606 (e.g., the right side 714 and the left side 712). In this way, the door 704 may receive twice the linear force as compared to a system with a single cable and pulley track system 730. Additionally in a system with two cable and pulley track systems 730, the multiple electric motors 734 may need to operate in synchronization.

Figure 13:
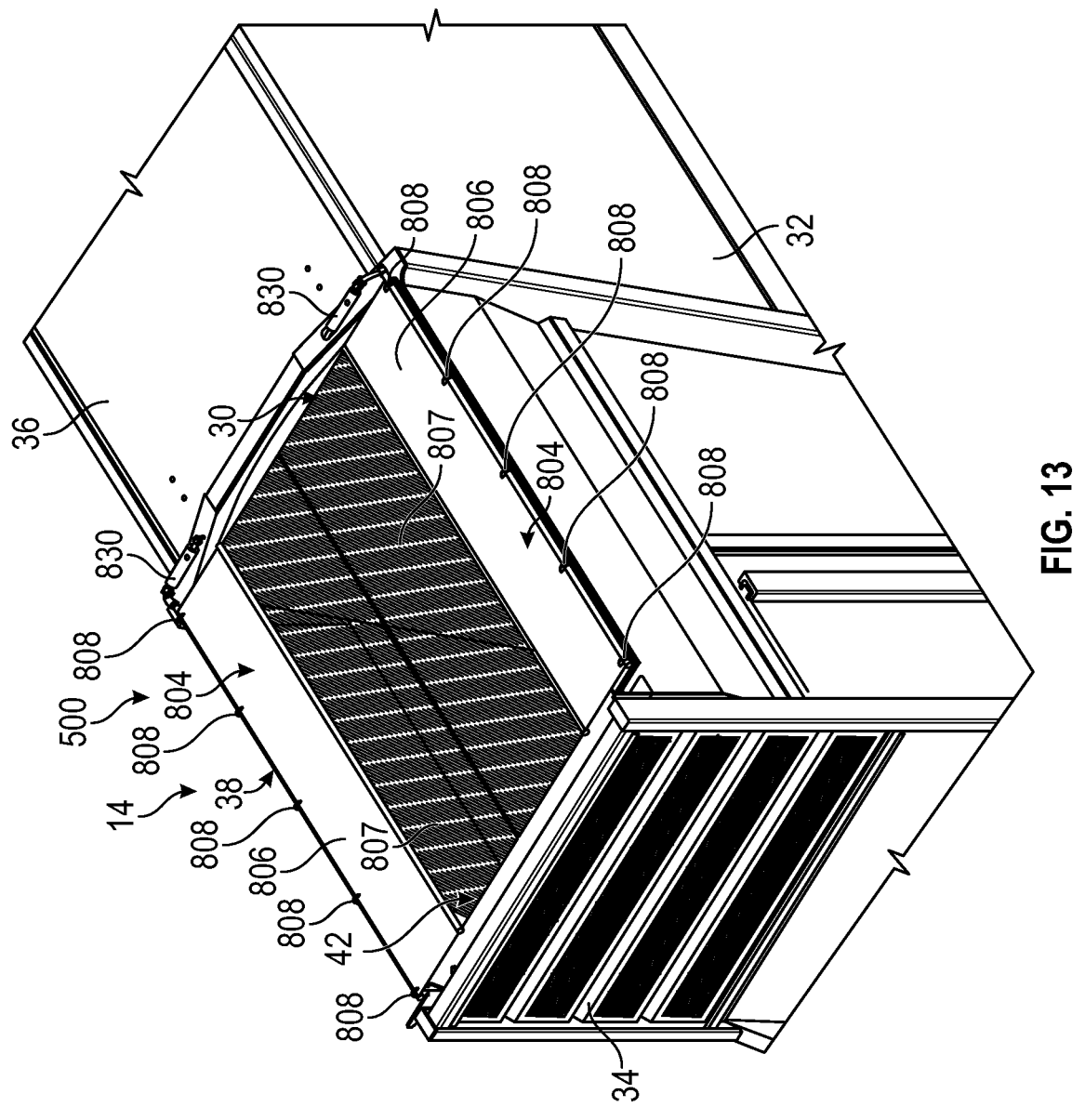
FIG. 13 is a perspective view of a sixth door system for the refuse vehicle of FIG. 1 in a closed position, according to an exemplary embodiment.
Figure 14:
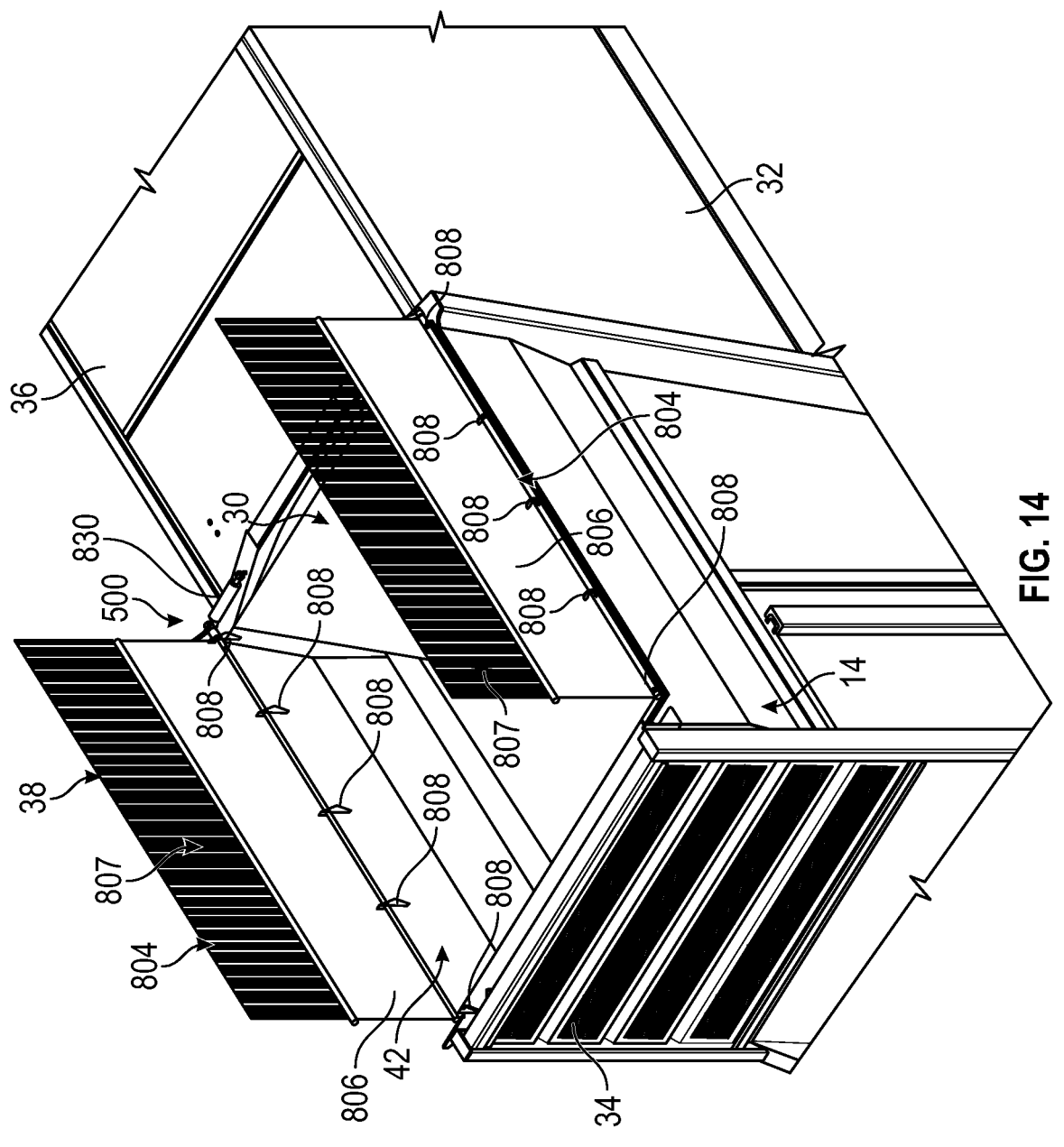
FIG. 14 is a perspective view of the sixth door system in an open position.

According to the exemplary embodiment shown in FIGS. 13-14 the top door system 500 is configured as a sixth door system to be used in place of the first door system of FIGS. 2-4. As shown in FIGS. 13-14, the top door system 500 includes one or more rotatable doors, shown as hinged doors 804. Each hinged door 804 includes multiple hinges 808, a rigid panel 806, and a flexible panel 807. In one embodiment, there are two opposed hinged doors 804, each door 804 located above the hopper opening 42. The rigid panel 806 is a panel made of a rigid material such as aluminum or other metals and is coupled to the respective hinges 808 and coupled to the flexible panel 807. The hinges 808 are coupled to the body 14 and the respective rigid panel 806 and are configured to provide a pivotal attachment between the respective door 804 and the body 14. In this way, the respective door 804 to is able to pivot about the body 14. In some embodiments, each door 804 pivots about a respective pivot axis located along the hinges 808. The hinges 808 may be any kind of hinges including barrel hinges, butt hinges, piano hinges, butterfly hinges, flush hinges, pivot hinges, spring hinges, and the like. The flexible panel 807 is a generally non-rigid panel that is made of flexible brushes or similar items and is coupled to the rigid panel 806. In this way, when the door 804 is open (FIG. 14) and the flexible panel 807 is relatively vertical, the flexible panel 807 will bend if it comes into contact with another solid structure. For example, if the flexible panel 807 was under a bridge when the door 804 is opened, the flexible panel 807 could possibly contact the bridge. In this situation, because the flexible panel 807 is made of flexible materials, the flexible panel 807 will bend. As shown, in the second position (e.g., the open position) the flexible panel 807 is vertically higher than the rigid panel 806. In this way, the rigid portion of the door 804 extending above the refuse vehicle 10 is relatively less than if both the panels were rigid.

The top door system 500 further includes one or more actuators 830. In one embodiment, there is one actuator 830 for every hinged door 804. In another embodiment, there are two actuators 830 for every hinged door 804. Each actuator 830 is coupled to the body 14 at one end and one or more hinges 808 at a second end. In some embodiments, the hinge 808 that is coupled to the actuator 830 is different (e.g., different size, type, or layout) from the other hinges 808 that are only coupled to the respective 804 and the body 14. Each actuator 830 is electrically coupled to the energy storage and/or generation system 20. In this way, when the respective actuator 830 receives power, the actuator 830 is configured to extend or retract. When extending, each actuator 830 contacts the one or more hinges 808 and moves the respective door 804 from a relatively horizontal position (FIG. 13) to a relatively vertical position (FIG. 14). The actuators may provide a linear force to the one or more hinges 808 which therefore are coupled to the door 804 and provide a rotational force to the respective door 804. In this way when the respective actuator 830 extends, the door 804 moves to an open position (second position) where the hopper opening 42 is accessible (not covered) and when the respective actuator 830 retracts, the door 804 moves to a closed position (first position) where the hopper opening is sealed (and/or covered).

In an exemplary embodiment, there are two opposed actuators 830 located at proximate an end of the hopper opening 42, each coupled to at least one hinge 808. In some embodiments, the at least one hinge 808 is located proximate an end of the hopper opening 42. In an exemplary embodiment, the actuator 830 is a linear actuator configured to extend and retract to move the at least one of the doors 804 between the open position and the closed position. According to an exemplary embodiment, the actuator 830 is an electric actuator configured to be powered via electricity provided by the energy storage and/or generation system 20 or another electrical source on the refuse vehicle 10 (e.g., a generator, solar panels, etc.). In one embodiment, the actuator 830 is or includes a ball screw driven by an electric motor. In other embodiments, another type of electrically driven, linear actuator is used (e.g., a lead screw actuator, etc.). In an alternative embodiment, the actuator 830 is a hydraulic cylinder driven by an electronically driven hydraulic pump (e.g., driven by the electric motor 18, the secondary electric motor, etc.).

Figure 15:
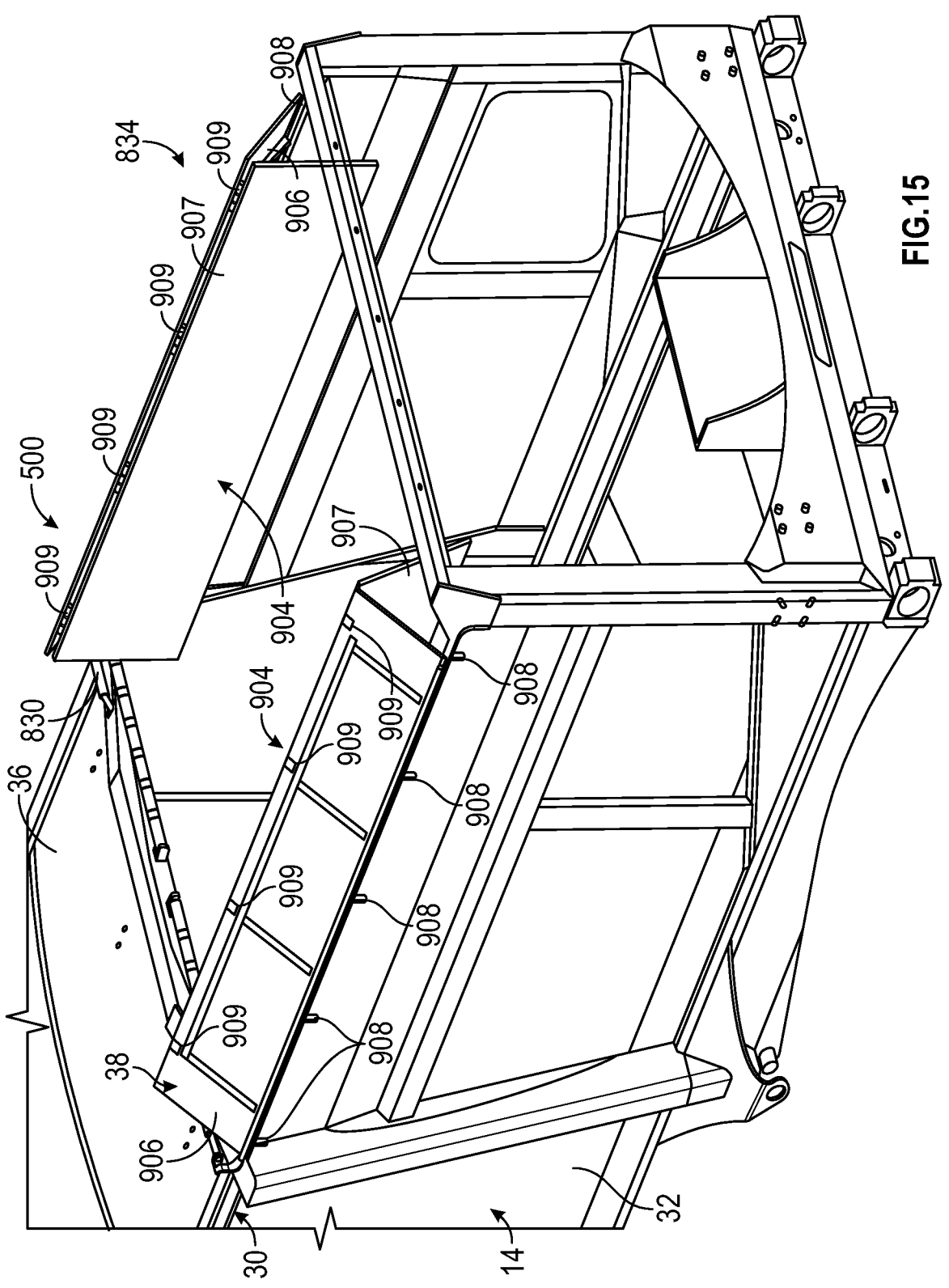
FIG. 15 is a perspective view of a seventh door system for the refuse vehicle of FIG. 1 in an open position, according to an exemplary embodiment.
Figure 16:
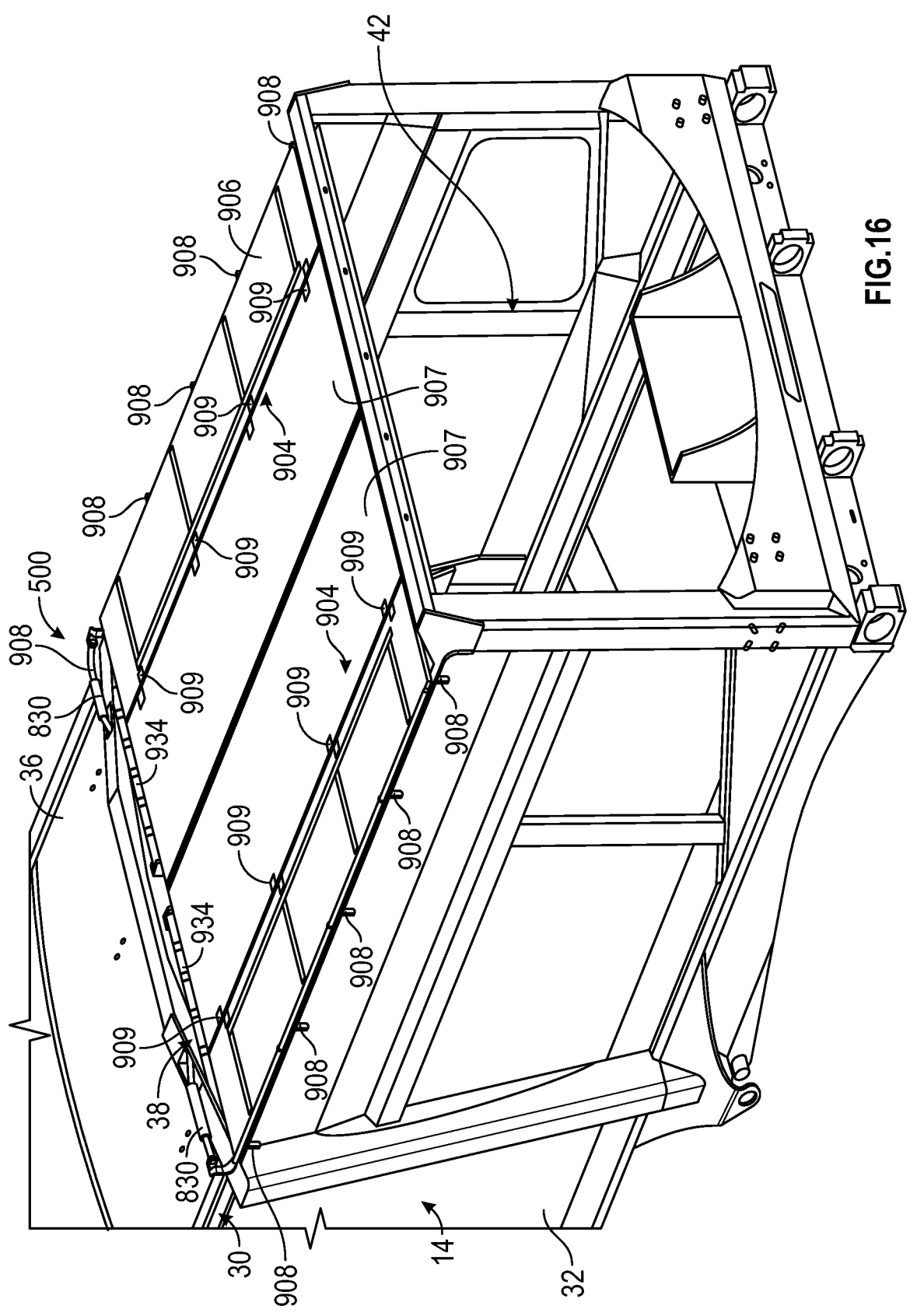
FIG. 16 is a perspective view of the seventh door system in a closed position.

According to the exemplary embodiment shown in FIGS. 15-16 the top door system 500 is configured as a seventh door system to be used in place of the sixth door system of FIGS. 13-14. As shown in FIGS. 15-16, the top door system 500 includes one or more rotatable doors, shown as bifold doors 904. Each bifold door 904 includes multiple first hinges 908, a first rigid panel 906, multiple second hinges 909, and a second rigid panel 907. In one embodiment, there are two opposed bifold doors 904, each door 904 located above the hopper opening 42. The first hinges 908 are coupled to the body 14 and the respective first rigid panel 906 and are configured to provide a pivotal attachment between the respective door 904 and the body 14. In this way, the respective door 804 is able to pivot about the body 14. In some embodiments, each door 904 pivots about a respective pivot axis located along the first hinges 908. Each bifold door 904 further includes multiple second hinges 909, the second hinges 909 are coupled to the respective first rigid panel 906 and the respective second rigid panel 907 and provide a pivotal attachment between the first rigid panel 906 and the second rigid panel 907. In this way, the second rigid panel 907 is able to pivot about the first rigid panel 906 creating a type of bifold. In one embodiment, the second rigid panel 907 pivots about a pivot axis located along the longitudinal length of the second hinges 909. The first hinges 908 and the second hinges 909 may be any kind of hinges including barrel hinges, butt hinges, piano hinges, butterfly hinges, flush hinges, pivot hinges, spring hinges, and the like. In some embodiments, the first hinges 908 and the second hinges 909 are two different types of hinges.

The top door system 500 further includes one or more actuators 830. The actuators 830 may operate and be similar to the actuators 830 in the sixth door system. For example, each actuator 830 may be coupled to the body 14 and the respective first hinges 908. Then, when extending, each actuator 830 contacts the one or more first hinges 908 and moves the respective door 904 from a relatively horizontal (closed) position (FIG. 16) to a relatively vertical (open) position (FIG. 15). The top door system 500 further includes one or more bifold operators 934. The bifold operators 934 are configured to operate the respective second hinges 909 to allow the respective second rigid panel 907 to pivot about the respective first rigid panel 906. There may be a single bifold operator 934 for each door 904. The bifold operators 934 are in synch with the actuators 830 to allow the second rigid panel 907 to pivot about the first rigid panel 906 when the door 904 is in the open position (a second position shown in FIG. 15) and to prevent the second rigid panel 907 from pivoting about the first rigid panel 906 when the door 904 is in the closed position (a first position shown in FIG. 16). In this way when each door 904 is in the open position, each second rigid panel 907 points relatively downward and not vertical, providing a much lower profile above the refuse vehicle 10 when the doors 904 are in the open position.

In one embodiment, each bifold operator 934 is a ball screw actuator or other type of actuator including a screw and a rail located along the lateral length of the first rigid panel 906 and the second rigid panel 907. The rail may be coupled to the first rigid panel 906 and the second rigid panel 907 and receive the screw, the screw keeping the second rigid panel 907 from pivoting. To allow the second rigid panel 907 to pivot (shown in FIG. 15) about the first rigid panel 906, the ball screw actuator may receive the screw until it is no longer along the side of the second rigid panel 907 allowing it to pivot downward. Then to bring the second rigid panel 907 parallel to the first rigid panel 906 (shown in FIG. 16), the rail along the second rigid panel 907 may again receive the screw. In an alternative embodiment, the bifold operators 934 are electric motors electrically coupled to the energy storage and/or generation system 20 and coupled to the second hinges 909 and/or the first rigid panel 906. To allow the second rigid panel 907 to pivot about the first rigid panel 906, the electric motors provide no torque to the second hinges 909 allowing gravity to pull the second rigid panel 907 downward. To prevent the second rigid panel 907 from pivoting about the first rigid panel 906, the electric motors may provide a torque in an opposed direction of pivot. The torque may move the second rigid panel 907 to be generally parallel to the first rigid panel 906. The bifold operators 934 may further include an electric locking mechanism that locks the second rigid panel 907 while it is not opening or closing. In this way, the electric motors do not have to provide a constant torque while the doors 904 are closed.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the refuse vehicle 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A refuse vehicle comprising:
a chassis;
a body assembly coupled to the chassis, the body assembly defining a refuse compartment and an opening in a roof to provide access to the refuse compartment; and
a door system comprising:
a door disposed on the roof of the body assembly; and
an electric actuator configured to linearly extend or retract to translate the door between a closed position where the door limits access to the refuse compartment through the opening and an open position where the refuse compartment is accessible through the opening, wherein the electric actuator is centered along a longitudinal centerline of the door and is configured to provide a force to the door along the longitudinal centerline of the door to move the door between the closed position and the open position by providing a force along the longitudinal centerline of the door without rotating the door;

wherein the electric actuator extends over the door and is coupled with a rear actuator interface on the body assembly, wherein the rear actuator interface is disposed at a rear end of the body assembly.

2. The refuse vehicle of claim 1, wherein the electric actuator is a ball screw actuator driven by an electric motor.

3. The refuse vehicle of claim 2, wherein the ball screw actuator is positioned along the longitudinal centerline of the door.

4. The refuse vehicle of claim 2, wherein the ball screw actuator is a first ball screw actuator, the door system further including a second ball screw actuator, the first and second ball screw actuators configured to selectively reposition the door between the closed position where the door extends across the opening and the open position where the door does not extend across the opening.

5. The refuse vehicle of claim 4, wherein the first ball screw actuator and the second ball screw actuator are located along opposed sides of the door.

6. The refuse vehicle of claim 5, wherein the first ball screw actuator and the second ball screw actuator operate in synchronization.

7. The refuse vehicle of claim 1, wherein the electric actuator is coupled with a portion of the body assembly at a first end and is coupled with a portion of the door at a second end.

8. A refuse vehicle comprising:

a body assembly coupled to a chassis, the body assembly defining an inner volume and an opening in a roof to provide access to the inner volume; and a door system comprising:

a door disposed on the roof of the body assembly; and an electric actuator configured to linearly extend or retract to selectively translate the door in a longitudinal direction between a closed position where the door limits access to the inner volume through the opening and an open position where the inner volume is accessible through the opening, wherein the electric actuator is centered along a longitudinal centerline of the door and is configured to provide a force to the door in a direction that is parallel with the longitudinal direction of the door to selectively reposition the door between the closed position and the open position without causing the door to pivot, wherein the longitudinal direction of the door extends in a direction from a front of the refuse vehicle to a rear of the refuse vehicle;

wherein the electric actuator is coupled with a rear actuator interface on the body assembly, wherein the rear actuator interface is disposed at a rear end of the body assembly.

9. The refuse vehicle of claim 8, wherein the electric actuator is a ball screw actuator driven by an electric motor.

10. The refuse vehicle of claim 9, wherein the ball screw actuator is positioned along the longitudinal direction of the door.

11. The refuse vehicle of claim 9, wherein the ball screw actuator comprises a first ball screw actuator and a second ball screw actuator, the first and second ball screw actuators configured to selectively reposition the door between the closed position where the door extends across the opening and the open position where the door does not extend across the opening.

12. The refuse vehicle of claim 11, wherein the first ball screw actuator and the second ball screw actuator are located along opposed sides of the door.

13. The refuse vehicle of claim 12, wherein the first ball screw actuator and the second ball screw actuator operate in synchronization.

14. The refuse vehicle of claim 8, wherein the electric actuator is coupled with a portion of the body assembly at a first end and is coupled with a portion of the door at a second end.

* * * * *